United States Patent [19]

Keating et al.

[11] Patent Number: 5,470,410
[45] Date of Patent: Nov. 28, 1995

[54] METHOD FOR PRODUCING A THREE-DIMENSIONAL WORK FROM A TWO-DIMENSIONAL WORK

[75] Inventors: Kent G. Keating, Amherst; Joseph A. Drago, Williamsville, both of N.Y.

[73] Assignee: Photo Sculptures, Inc., Amherst, N.Y.

[21] Appl. No.: 220,839

[22] Filed: Mar. 31, 1994

[51] Int. Cl.⁶ ................................................. B32B 31/00
[52] U.S. Cl. .................... 156/63; 156/264; 40/160
[58] Field of Search ........................ 156/58, 59, 63, 156/264; 40/160

[56] References Cited

U.S. PATENT DOCUMENTS

| | | | |
|---|---|---|---|
| 3,447,274 | 6/1967 | Davidson | 156/63 X |
| 3,868,283 | 2/1975 | Scheyer | 40/160 X |
| 4,353,327 | 10/1982 | Shroyer | 40/160 X |

*Primary Examiner*—James Engel
*Attorney, Agent, or Firm*—Phillips, Lytle, Hitchcock, Blaine & Huber

[57] ABSTRACT

A method to create a three-dimensional work from a single copy of a two-dimensional work such as a photograph, poster, drawing or painting. A single copy of the two-dimensional work is bonded to a stiff backer forming a composite. The composite is cut using a sculpture station into a plurality of pieces. The pieces are reattached to each other by spacers forming more than one layer. The resulting work can be displayed on a framing box adapted for any surface.

16 Claims, 4 Drawing Sheets

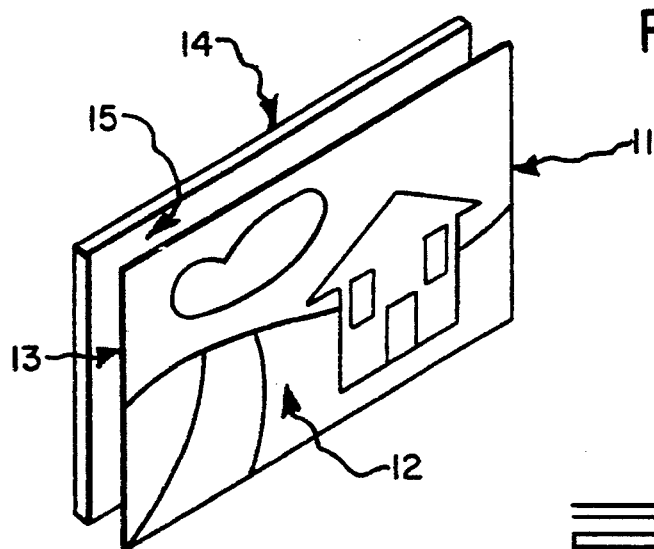
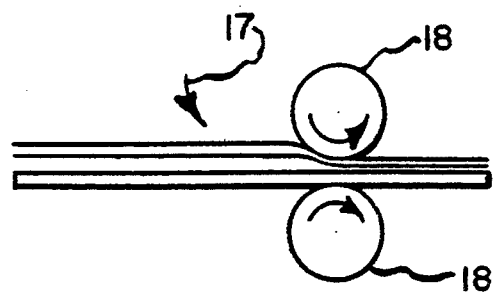
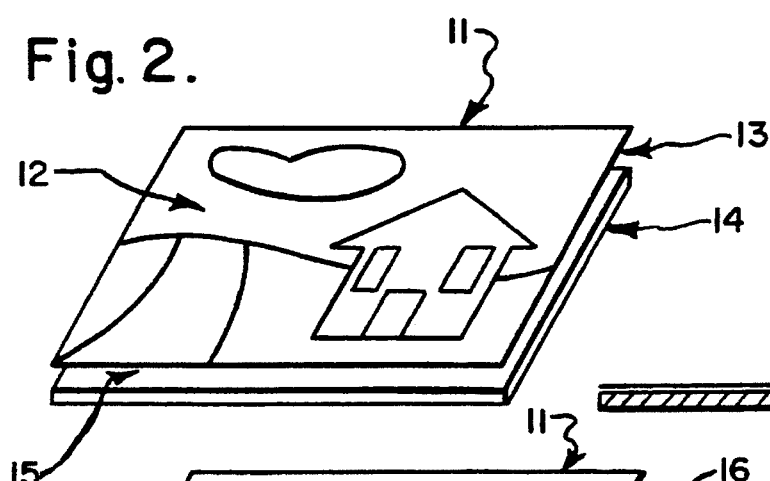
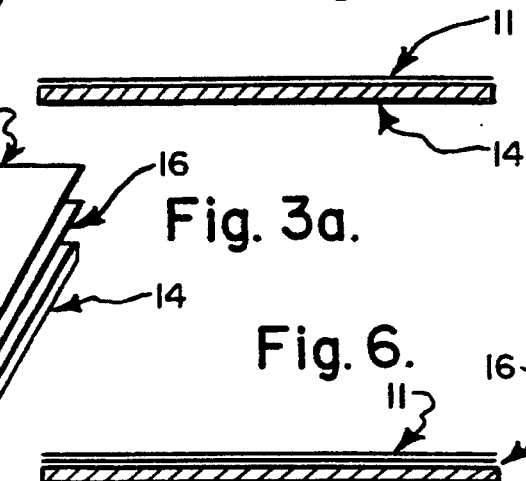
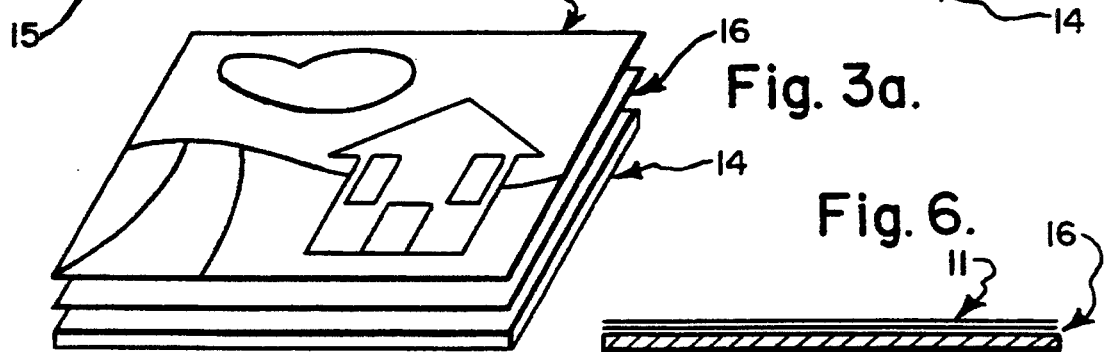
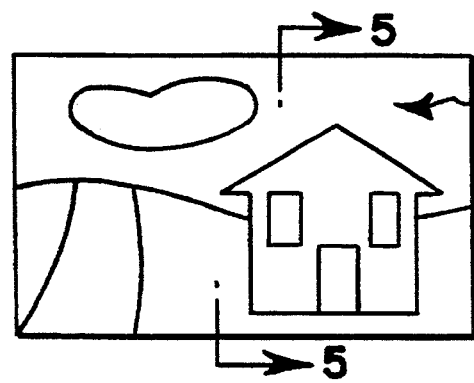

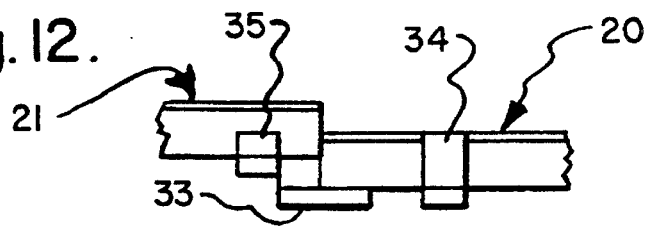
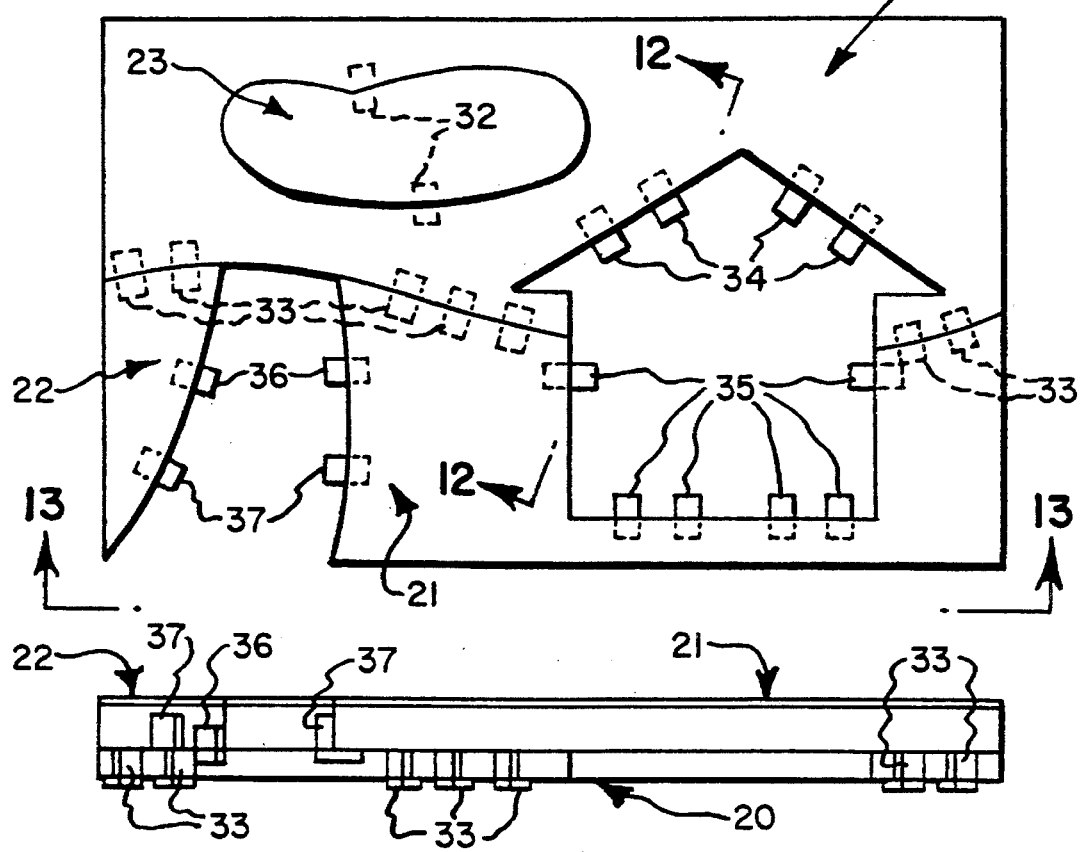
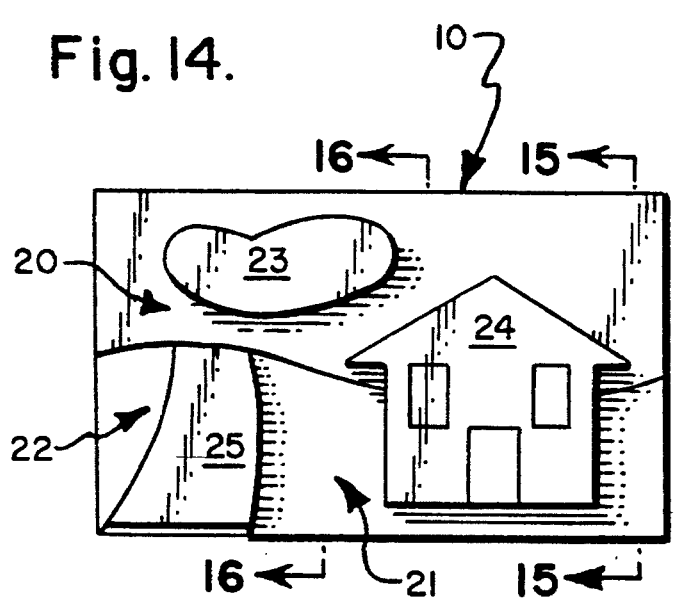
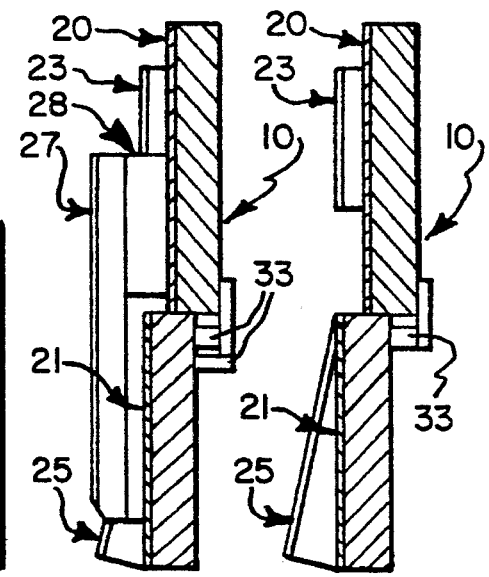

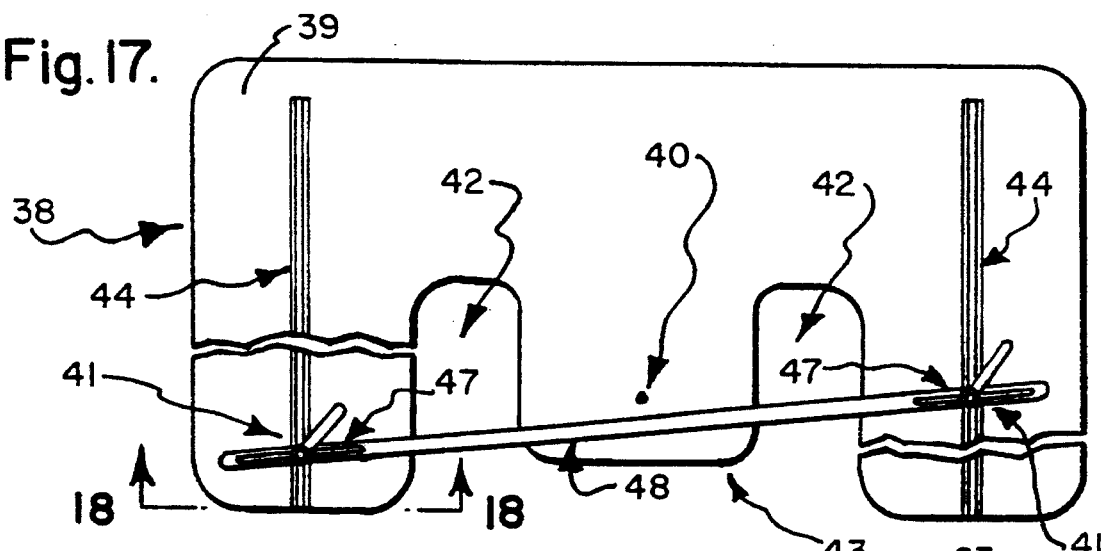
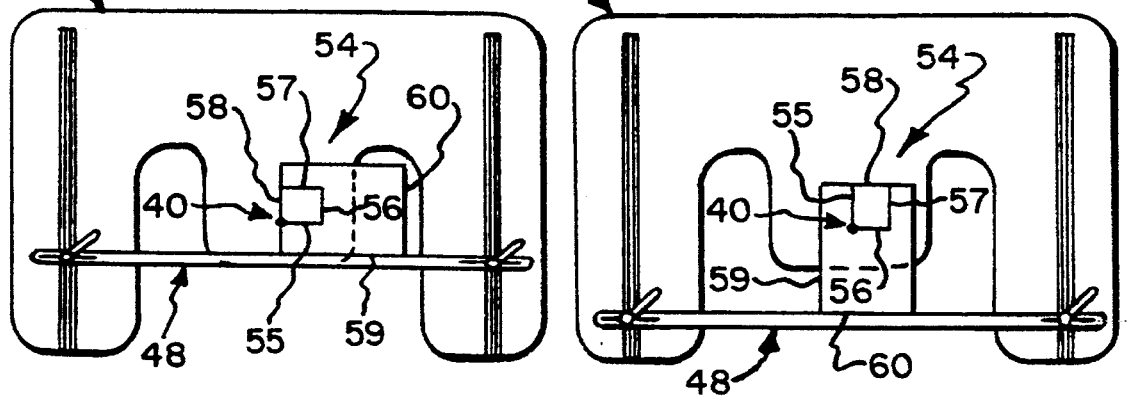

METHOD FOR PRODUCING A THREE-DIMENSIONAL WORK FROM A TWO-DIMENSIONAL WORK

TECHNICAL FIELD

The present invention relates generally to a method of mounting and display of works (e.g., photographs, posters, drawings, etc.) More specifically, to a method for mounting and displaying two-dimensional works in three dimensions.

BACKGROUND OF INVENTION

It is well known to represent three-dimensional subjects in two dimensions. Examples include drawings, posters, paintings and photographs. In many instances, two-dimensional representations of objects or scenes do not adequately capture the qualities of a subject. Accordingly, to form a more realistic representation and to accent certain portions of two-dimensional works, attempts have been made in the prior art to represent two-dimensional displays in three dimensions.

In the prior art, there are three general solutions: first, shapes are attached over certain portions of the two-dimensional work producing a three-dimensional step effect (U.S. Pat. No. 3,574,017 (Kass)); second, cutting slits into two-dimensional work then raising or depressing sections along the slits in relation to one another thereby forming three-dimensional shapes (U.S. Pat. No. 4,161,831 (Restle)); third, a combination of the first two methods by attaching shapes over certain portions of the two-dimensional work then slopping the edges of the attached shapes or placing a larger overlay on the attached shape merging the shape or overlay with the background or other raised shapes (U.S. Pat. Nos. 3,868,283 (Scheyer) and 3,553,062 (Berlin)).

The Kass patent creates three dimensions by arranging three-dimensional shapes on a sheet over pre-drawn outlines for each shape then rolling or placing on the positioned shapes a background, thus forming the desired three-dimensional image. It is difficult with the Kass method to vary the height of the three-dimensional shapes attached to the background, thus, reducing the realism of the finished three-dimensional work. If the height of the shapes vary substantially, when the background is rolled or placed on top of the shapes, they will not attach at the desired locations. For example, if a shape is twice as high as an adjoining shape, as the background is rolled or placed over the shapes, they will not affix to the background adjoined to one another. In contrast, the current invention allows for precise placement of the shapes in many layers forming the third dimension, depth.

The Restle patent claims a pictorial presentation of a subject cut away from its background. The subject is first cut from the background and then slits are made in the subject facilitating the bending of contours forming a three-dimensional work. The display described and claimed by the Restle patent is unable to establish depth between multiple objects and contemplates working with a single object or shape. In the present invention, a more realistic presentation of the subject matter is accomplished by placing two-dimensional representations in three-dimensional relation to one another. The difference in distance from the viewer to each layer forms the illusion of depth.

The Scheyer patent claims a method where portions of a two-dimensional work become three-dimensional by layering desired portions cut from multiple copies of the two-dimensional work above appropriate portions of the two-dimensional work. In the case of expensive posters, prints and large photographs, the necessity of multiple copies becomes cost prohibitive. The present method contemplates use of a single two-dimensional work to form a realistic three-dimensional work. Also, the current method produces a sturdier three-dimensional product since the pieces supported above the two-dimensional work have a rigid backer layer while the Scheyer patent produces a three-dimensional work with easily deformable layers not having supportive backer.

Finally, the present invention cuts the two-dimensional work using a sculpture station having a cutting blade capable of changing cutting direction during a cut. The cutting blade has a circular cutting surface allowing freedom in cutting direction facilitating extremely precise cutting, even of intricate shapes. The sculpture station also has a unique guide fence apparatus allowing the operator to alter the angle of a straight cut guided by the fence while performing the cut. The function and attributes of the sculpture station are not obvious over or anticipated by the prior art.

Thus, the present invention provides a new method for representing two-dimensional works in three-dimensions from a less expensive method using a unique cutting device producing a sturdier and more realistic three-dimensional representation than known in the prior art.

DISCLOSURE OF THE INVENTION

The present invention provides a method for producing a three-dimensional work (e.g., 10) from a two-dimensional work (e.g., 11). A two-dimensional or planar work (e.g., 11) is bonded to a backer (e.g., 14) made of rigid material thus forming a work piece (e.g., 19). The work piece (e.g., 19) is cut into background pieces (e.g., 20) and sculpture pieces (e.g., 21–25) using a sculpture station (e.g., 38) capable of precise cutting and changing directions during a cut.

The sculpture station (e.g., 38) has a cutting blade (e.g., 40) with a circular cutting surface (e.g., 52). The cutting blade (e.g., 40) moves in a vertical up and down motion perpendicular to the work surface (e.g., 39). Because the circular cutting surface (e.g., 52) allows the cutting blade (e.g., 40) to cut in any direction, the direction of a cut can be altered while performing the cut. The sculpture station (e.g., 38) also has a guide fence apparatus (e.g., 41) capable of adjustment during a cut thus allowing the operator to perform a single cut in many directions, each guided by the guide fence (e.g., 48).

The spacers (e.g., 32–37) are attached at the edges of the background and sculpture pieces. The sculpture pieces (e.g., 21–25) are attached to one another and to the background pieces (e.g., 20) by the spacers (e.g., 32–37). The spacers (e.g., 32–37) are of varied heights, thus, when the background pieces and sculpture pieces are connected, different layers are formed creating a three-dimensional work (e.g., 10).

To protect the three-dimensional work, a clear protective coat can be applied, thus prolonging the life of the three-dimensional work.

Since the three-dimensional work (e.g., 10) has discongruent levels, it is difficult to mount for display. A framing box (e.g., 63) having a level surface is attached to the entire perimeter of the three-dimensional work (e.g., 10). This level surface supports the three-dimensional work (e.g., 10) against a wall or other surface. Also, it is known the framing box (e.g., 63) will prevent three-dimensional work (e.g., 10) from warping over time. Finally, framing box (e.g., 63) hides the back surface of the three-dimensional work (e.g., 10) thus preventing a viewer from seeing the unsightly workmanship needed to produce the three-dimensional work (e.g. 10).

A primary objective of the invention is to provide a method for transforming a single copy of a two-dimensional work into three dimensions. By using a single copy of the two-dimensional work, substantial savings are realized over prior art methods using multiple copies.

Another object of the invention is to produce a sturdy three-dimensional art piece by creating depth in the field of view through rigid shapes securely attached at different distances from one another. Therefore, the frail nature of prior art using flexible shapes is improved upon.

Still another object of the invention is to provide a process adaptable to all types two-dimensional works, including those with intricate shapes and figures.

Still another object of the invention is to provide a process of making three-dimensional works from two-dimensional works using a cutting device capable of changing cutting direction mid-cut to any direction perpendicular to the movement of the cutting blade and also having a guide fence apparatus capable of altering the angle of a guided straight cut while performing the cut.

Still another object of the invention is to provide a process for transforming a two-dimensional work into a three-dimensional work having a framing box to prevent its warping, hinder view of the unsightly workmanship on its back surface and to make its display easier.

These and other objects of the invention will become apparent from the foregoing and ongoing written specification, the drawing figures and claims that follow.

BRIEF DESCRIPTION OF THE DRAWINGS

FIG. 1 is a perspective view of two-dimensional work 11 and backer 14.

FIG. 2 is an exploded perspective view of two-dimensional work 11 and backer 14 when bonded using contact adhesive.

FIG. 3a is an exploded perspective view of two-dimensional work 11 and backer 14 as bonded using the roll or plate bonding method.

FIG. 3b is a side plan view of composite 17 being rolled through a set of rollers 18 as contemplated by the roll method.

FIG. 4 is a front plan view of work piece 19.

FIG. 5 is a vertical cross-section of work piece if it was formed using the contact adhesive method along line 5 of FIG. 4.

FIG. 6 is a vertical cross-section of work piece 19 if formed using the roll or plate method along line 5 of FIG. 4.

FIG. 11 is a front plan view of background piece 20 attached to sculpture pieces 21 and 22.

FIG. 12 is a vertical cross-section of FIG. 11 taken along line 12 of FIG. 11.

FIG. 13 is a side plan view of FIG. 11 along line 13 of FIG. 11.

FIG. 14 is a front plan view of three-dimensional work 10.

FIG. 15 is a vertical cross-section of three-dimensional work 10 along line 15 of FIG. 14.

FIG. 16 is a vertical cross-section of three-dimensional work 10 along line 16 of FIG. 14.

FIG. 17 is a top plan view of sculpture station 38.

FIG. 18 is a cross-section along line 18.

FIG. 19 is a side plan view of cutting blade 40.

FIG. 20 is a top plan view of sculpture station 38 cutting sample work piece 54.

FIG. 21 is a top plan view o: sculpture station 38 cutting sample work piece 54.

FIG. 22 is a perspective view of framing box 63.

FIG. 23 is an exploded side plan view of three-dimensional work 10 attached to framing box 63.

MODES OF CARRYING OUT THE INVENTION

Figure 7:
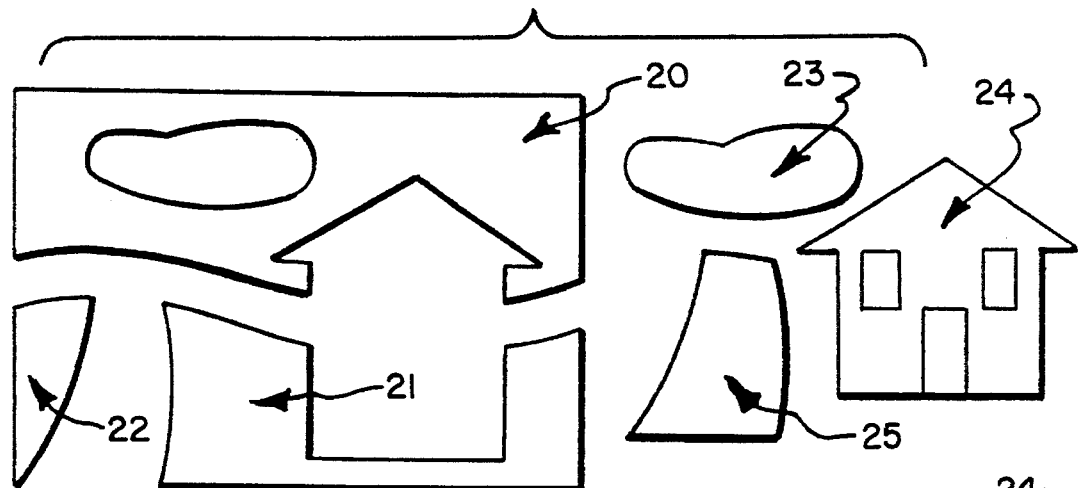
FIG. 7 is a front plan view of background piece 20 and sculpture pieces 21–25.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIG. 1, two-dimensional work 11 and backer 14 are shown. The two-dimensional work 11 has a display surface 12 and a back surface 13 opposite display surface 12. For the purposes of illustration only, display surface 12 depicts a house, cloud, section of road and horizon. Backer 14 is made of ¼ inch thick acrylic plastic having a front surface 15 at least as long and as wide as two-dimensional work 11. Backer 14 is acrylic for illustrative purposes only. Acrylic is easy to work with and available in a variety of thicknesses and colors. Other materials suitable for use as backer material are wood and other plastics such as expanded PVC and lexan plastic.

The method contemplates bonding two-dimensional work 11 to backer 14 forming work piece 19. Bonding is accomplished using any one of a variety of methods well known in the art. Adverting to FIG. 2, one method of bonding involves the application of contact adhesive by sprayer, roll or brush to back surface 13 and front surface 15 then joining the coated surfaces together. FIG. 5 shows a cross-section of work piece 19 created using contact adhesive. The thickness of two-dimensional work 11 is exaggerated to facilitate understanding of the figure.

A cold roll method may also be used to bond two-dimensional work 11 and backer 14. Adverting to FIG. 3a, in the cold roll method a pressure sensitive sheet or two-sided sticky transfer sheet 16 is placed between back surface 13 and front surface 15. Adverting to FIG. 3b, two-dimensional work 11, backer 14 and transfer sheet 16 are layered forming composite 17 which is passed between a set of rollers 18. The pressure exerted by rollers 18 activates the transfer sheet forming a permanent bond between two-dimensional work 11 and backer 14.

With some transfer sheets, rollers 18 must be heated for transfer sheet 16 to form a bond when passed through rollers 18. This is well known in the art as a hot roll method. It is also well known to provide the pressure needed to activate transfer sheet 16 by a press instead of rollers 18 when bonding two-dimensional work 11 and backer 14. FIG. 6 shows a cross-section of work piece 19 formed by a roll or press method. Again, the thickness of two-dimensional work 11 and transfer sheet 16 are exaggerated to facilitate an understanding of the figure.

Once work piece 19 is formed, the method contemplates applying any well known edge treatment (e.g., bull-nose, cove, bead, classical, provincial etc.) to work piece 19, thus, enhancing the aesthetics of three-dimensional work 10. It is well known in the art such edged treatments can be applied using a router, edge shaper or sander. Further, the method contemplates treating work piece 19 with a protective layer. It is well known in the art to apply clear photographic lacquer, finishes, epoxies or resins to two and three dimensional works. These protectants will slow fading and increase the life span of three-dimensional work 10.

The method next provides for work piece 19 to be cut into a number of pieces using sculpture station 38. Adverting to FIG. 17, sculpture station 38 comprises work surface 39 perpendicular to cutting blade 40 and guide fence apparatus 41 designed to allow the adjustment of a cutting angle during the cut.

Work surface 39 here is made of FORMICA, a plastic laminate allowing work piece 19 to slide easier. Also, the shape of work surface 39 is designed to provide the operator an optimum amount of control when cutting. While a work piece is being cut, Gaps 42 allow manipulation of the work piece from underneath. Gap 43 allows the operator to be nearer cutting blade 40 when performing intricate cuts.

Adverting to FIG. 18, the interaction of the parts comprising guide fence apparatus 41 are shown. The cross-section of guide fence channel 44 is a generally U-shaped member with flanges 45. T-bolt 46 passes through slit 47 in guide fence 48. Ratchet clutch 49 engages end 50 of T-bolt 46. Ratchet clutch 49 is not the only device capable of engaging end 50. Another example would be a large wing nut. Guide fence 48 is held in place against work surface 39 by ratchet clutch 49 pulling T-end 51 flush against flanges 45.

Cutting blade 40 moves vertically up and down in a piston motion perpendicular to work surface 39. Cutting blade 40 is capable of cutting in all directions perpendicular to its vertical movement because it has a circular cutting surface 52. There are many types of cutting blades with circular cutting surfaces. Adverting to FIG. 19, one example is shown. Circular cutting surface 52 is a sharpened, thin protrusion from rod shaped main body 53 of cutting blade 40. Circular cutting surface 52 wraps and descends around main body 53. As cutting blade 40 moves vertically up and down, each point on circular cutting surface 52 contacts a position on the piece being cut. As cutting blade 40 continues to move, each point cuts away a layer of work piece 19 along its line of motion. No matter what direction work piece 19 is drawn against cutting blade 40, circular cutting surface 52 will contact and cut. The freedom of movement circular cutting surface 52 provides allows the operator to cut intricate shapes.

Many times interior shapes are comprised of a series of straight boundary lines. Guide fence apparatus 41 assists the operator in cutting these interior shapes. It is known for table saws to have a guide fence unable to be adjusted during cutting (e.g., circular table saw). On such table saws, it is not possible to adjust the direction of the cut after it is started because the blade is only capable of cutting in one direction and the saw fence is only capable of guiding in one direction.

Sculpture station 38 addresses this lack of cutting flexibility by providing guide fence apparatus 41 adjustable during a cut in conjunction with cutting blade 40 capable of cutting in any direction from any point.

To alter a cut angle while performing a cut, first release ratchet clutches 49 which in turn release T-bolts 46. T-bolts 46 are then free to slide along guide fence channels 44 thus repositioning guide fence 48. Next, use ratchet clutches 49 to lock guide fence 48 against a new location on work surface 39. This system allows the operator to change cutting angles while performing a cut. Also, guide fence 48 can be set to provide a cut of any desired angle and can be used on work pieces of many sizes.

For example, adverting to FIG. 20, sculpture station 38 is able to cut along lines 55–58 of sample work piece 54 using one cut. First, guide fence 48 is locked in place a distance from cutting blade 40 representing the distance from edge 59 of sample work piece 54 to line 55. Edge 59 of sample work piece 54 is drawn along guide fence 48 until the cutting blade 40 reaches where lines 55 and 56 meet. The guide fence 48 is released and moved away from cutting blade 40 to allow free movement of sample work piece 54. Adverting to FIG. 21, sample work piece 54 is then rotated clockwise 90° and guide fence 48 is placed flush against edge 60 and locked into place. Sample work piece 54 is then drawn along guide fence 48 until the cutting blade 40 reaches the end of line 56. This process is repeated until lines 55–57 have been cut.

Also, the use of vertical moving cutting blade 40 allows sculpture station 38 to perform interior cuts without approaching a shape from an edge of work piece 19. For example, to cut cloud 23 from work piece 19, a cut would normally be made from the top of work piece 19 to reach the outer perimeter of cloud 23. By using sculpture station 38, cloud 23 is cut away from work piece 19 starting from a small hole drilled on the perimeter of cloud 23. The hole is large enough for the diameter of cutting blade 40 to fit through.

In this example the sculpture station is used to form one background piece 20 and five sculpture pieces 21–25. There is no difference between background piece 20 and sculpture pieces 21–25 except background piece 20 will form the layer farthest from the viewer of three-dimensional work 10.

Figure 8:
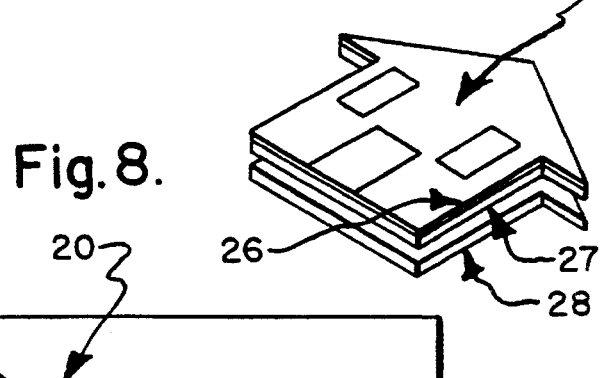
FIG. 8 is a perspective view of house 24 removed from work piece 19.

Adverting to FIG. 8, house 24 is shown. Because background piece 20 and each sculpture piece 21–25 are complete portions of work piece 19, each comprises a two-dimensional work portion 26 bonded to a backer portion 27. The method contemplates use of more than one layer of backer with a sculpture piece if desired. When different color backer layers are joined, a more aesthetically pleasing three-dimensional work 10 can result. Any sculpture piece 21–25 cut from work piece 19 can have multiple layers of backer applied. First, the sculpture piece is photocopied. The photocopy is then bonded as described above to a sheet of acrylic. This acrylic sheet need not be the same color or thickness as backer 14. Sculpture station 38 is used to cut the duplicate sculpture piece 28 from the acrylic sheet. This shape is next attached to the house 24 cut from work piece 19.

House 24 and duplicate sculpture piece 28 are permanently bonded using acrylic solvent. When applied to two adjoining pieces of acrylic, the solvents softens and liquifies portions of the acrylic faces in contact. The liquefied acrylic co-mingles and when the solvent dries, the adjoining pieces are permanently bonded.

Figure 9A:
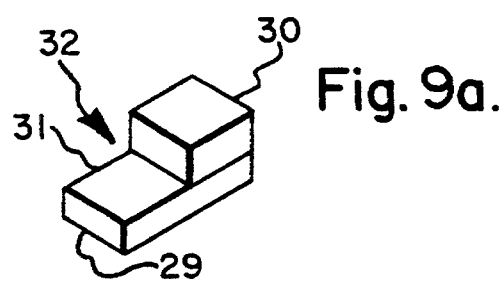
FIG. 9a is a perspective view of spacer 32.
Figure 9:
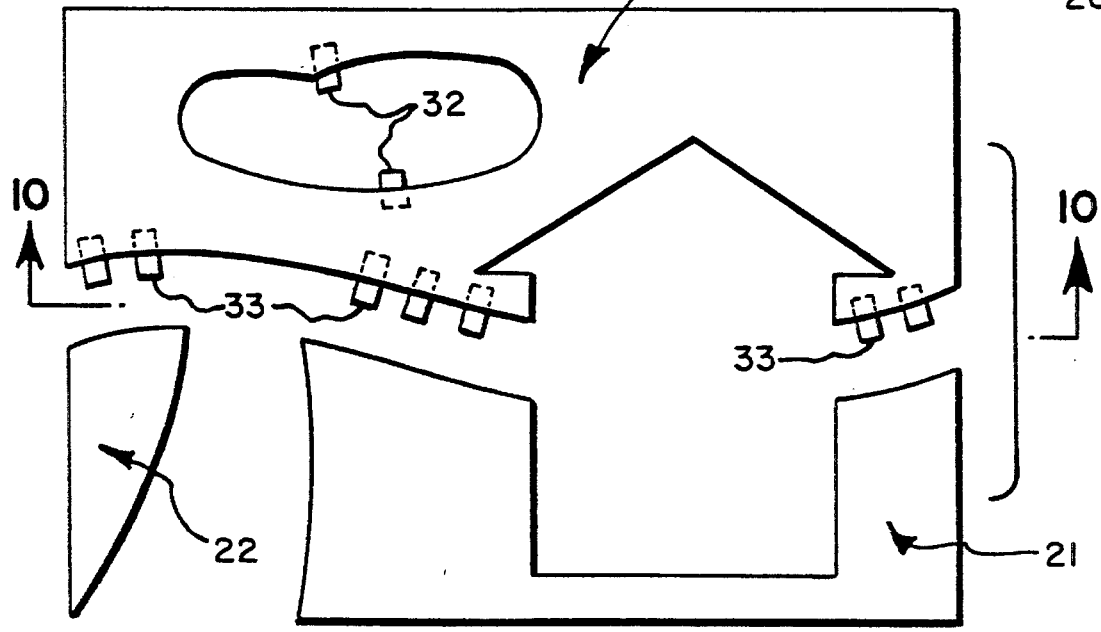
FIG. 9 is a front plan view of background piece 20 and sculpture pieces 21 and 22.

Adverting to FIG. 9, the method then provides for the use of spacers 32 and 33 to provide raised surfaces where sculpture pieces 21,22 and 23 will attach. Although all spacers in this example are L-shaped, the method contemplates spacers of all shapes such as cubes. Adverting to FIG. 9a, each spacer 32 is made of two acrylic pieces; platform piece 29 and support piece 30. Platform piece 29 is a ¼ inch by ⅛ inch by ¹⁄₁₆ inch rectangle while support piece 30 is a ⅛ inch cube. Platform surface 31 is attached using acrylic solvent to the back face of background piece 20 with support piece 30 protruding up through the hole formed when cloud 23 was cut from work piece 19.

Background piece 20 is ¼ inch thick and spacers 32 supporting cloud 23 protrude ⅛ inch above back face of background piece 20. Therefore, when cloud 23 is attached to spacers 32, it is supported ⅛ inch above back face of background piece 20, the reby establishing a new layer ⅛ inch above the front surface of background piece 20 and thus depth to three-dimensional work 10.

Figure 10:
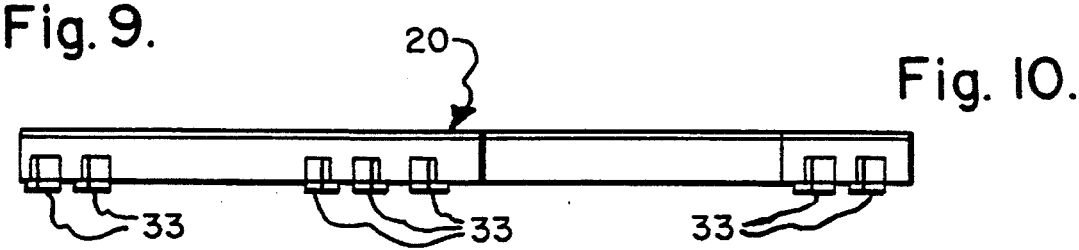
FIG. 10 is a side plan view of background piece 20 along line 10 of FIG. 9.

Adverting to FIG. 10, spacers 33 are also L-shaped having ⅛ inch high support pieces. Again each spacer 33 will support sculpture pieces 21 and 22 ⅛ inch above the back face of background piece 20.

Determining the number of spacers needed to support a certain sculpture piece depends on the sculpture piece's size and weight. For example, cloud 23, a small sculpture piece, needs only two spacers. Adverting to FIG. 11, house 24, a large sculpture piece with two backer layers, is supported by many spacers.

Adverting to FIG. 11, the method next provides for the attachment of sculpture pieces 21,22 and 23 to spacers 32 and 33. Since the bond between spacers 32 and 33 and background piece is between two pieces of acrylic, acrylic solvent is again used to form permanent bonds.

House 24 is to be parallel to background piece 20 and sculpture pieces 21,22 and 23. To accomplish this, L-shaped spacers 34 attached to background piece 20, have ¼ inch high support pieces and L-shaped spacers 35 attached to sculpture piece 21 have ⅛ inch support pieces. The difference in height between spacers 34 and 35 addresses the ⅛ inch difference in layering between background piece 20 and sculpture piece 21 supported on spacers 33. This can clearly be seen in FIG. 12.

It is not required to make each layer parallel to every other layer. The method also contemplates any orientation supportable by spacers. For example, spacers 36 have ⅛ inch support pieces while spacers 37 have ¼ inch support pieces. The top of each support piece is filed down to form a surface not parallel to background piece 20 or sculpture pieces 21–24. Road 25, when attached on the slanted surfaces of spacers 36 and 37, is ¼ inch higher than sculpture pieces 21 or 22 at their bottom but flush with both sculpture pieces 21 and 22 where all three meet background piece 20. The plane of sculpture piece 25 transecting the plane of sculpture pieces 21–24 and background piece 20 provides the illusion of road 25 travelling past house 25 into background piece 20.

Adverting to FIG. 14, a front plan view of the finished three-dimensional work 10 is shown. Adverting to FIG. 15 and 16, cross-section views of finished three-dimensional work 10 along lines 15 and 16 are shown. These figures show the layering of background piece 20 and sculpture pieces 21–25 in relation to one another.

Once the solvent has set, the method provides a second opportunity for treating three-dimensional work 10 with a clear protectant such as clear photographic lacquer, finishes, epoxy or resin.

Adverting to FIG. 22, the method further provides using a framing box 63 to support three-dimensional work 10 for mounting, to prevent warping and to hide the unsightly support structure on the back surface of three-dimensional work 10. Framing box 63 has four sides, 64–67, made of acrylic joined together by four acrylic blocks 68. Each side 64–67 is cut so one edge contacts the entire length of an edge on three-dimensional work 10. Side pieces 65 and 67 are J-shaped. The J-shape takes into the account the discontinuity formed where background piece 20 meets sculpture pieces 21 and 22. The edge of each side can be shaped to provide support on other than flat surfaces, e.g. a curved wall.

Adverting to FIG. 23, the method contemplates framing box 63 mating to three-dimensional work 10. Frame box 63 and three-dimensional work 10 are joined using blocks 68 an acrylic solvent.

MODIFICATION OF THE INVENTION

Although the process is disclosed using specific materials, tools and methods, it is clear from the specification, drawings and description of the process many modifications and changes may be made without departing from the invention.

A number of bonding processes are described but many other processes may form an adequate bond between the two-dimensional work and backer.

Further, the short list of edge treatments disclosed is by no means is a complete list.

These and other modifications and changes to the invention would be readily apparent to one of skill in the art and anticipated by the specification and description of the invention, as well as the following claims.

What is claimed is:

1. A method for producing a three-dimensional work from a single two-dimensional work, comprising the steps of:

providing a single two-dimensional work;

providing a rigid backer;

bonding said two-dimensional work to said rigid backer forming a work piece;

identification of shapes in said two-dimensional work to become sculpture pieces and background pieces;

providing a sculpture station having an oscillating cutting blade, said cutting blade having a circular cutting surface allowing said sculpture station to accurately and precisely cut a sculpture piece away from said work piece using a single uninterrupted cut;

cutting said work piece with said sculpture station into background pieces and sculpture pieces;

connecting at least two of said background pieces together forming a background;

providing spacers;

attaching said spacers to one or more of said background and said sculpture pieces, fixably positioning said sculpture pieces in relation to said background;

thereby forming a three-dimensional work composed of images in different layers from a single two-dimensional work.

2. The method defined in claim 1 wherein said sculpture station further comprises a work surface generally perpendicular to said oscillation of said cutting blade, said work surface having a cutting surface and two wings, each said wing separated from said cutting surface by an opening in said work surface; and guide fence apparatus mounted on said work surface, said guide fence apparatus comprising a guide fence channel, a guide fence, and a member having first and second ends, said first end adapted to engage said guide fence channel and said second end adapted to secure said guide fence to said work surface.

3. The method defined in claim 1 further providing said sculpture pieces are set in a plurality of planes.

4. The method defined in claim 1 further providing said work piece has an edge treatment on its perimeter.

5. The method defined in claim 1 wherein said bonding is provided by application of contact adhesive between said two-dimensional work and said backer.

6. The method defined in claim 1 wherein said bonding is provided by a roll method.

7. The method defined in claim 1 wherein said bonding is provided by a press method.

8. The method defined in claim 1 further comprising applying a protective coating to said work piece prior to its being cut into background pieces and sculpture pieces.

9. The method defined in claim 1 further comprising applying a protective coating to said completed three-dimensional work.

10. The method defined in claim 12 wherein said sculpture pieces are provided with more than one layer of backer.

11. The method defined in claim 1 further providing a flaming box, said flaming box dimensioned and configured to support said three-dimensional work, and the additional step of attaching said completed three-dimensional work to said flaming box for display.

12. The method defined in claim 1 wherein said background is comprised of each said background piece.

13. The method defined in claim 1 wherein each of said sculpture pieces is fixably positioned in relation to said background.

14. The method defined in claim 1 wherein said background recreates said work piece with said sculpture pieces removed.

15. The method defined in claim 1 wherein said backer and spacers are acrylic and permanent acrylic-to-acrylic bonds are formed using an acrylic solvent applied to the interface of two acrylic portions.

16. The method defined in claim 1 wherein said three-dimensional work is an ornamental wall hanging.

* * * * *